(12) United States Patent
Takamizawa (10) Patent No.: US 10,379,330 B2
(45) Date of Patent: Aug. 13, 2019

(54) SCANNING MICROSCOPE APPARATUS FOR GENERATING SUPER-RESOLUTION IMAGE BASED ON SET ZOOM MAGNIFICATION OR SET NUMBER OF PIXELS

(71) Applicant: OLYMPUS CORPORATION, Shibuya-ku, Tokyo (JP)

(72) Inventor: Nobuhiro Takamizawa, Kanagawa (JP)

(73) Assignee: OLYMPUS CORPORATION, Tokyo (JP)

( * ) Notice: Subject to any disclaimer, the term of this patent is extended or adjusted under 35 U.S.C. 154(b) by 66 days.

(21) Appl. No.: 14/789,167

(22) Filed: Jul. 1, 2015

(65) Prior Publication Data
US 2016/0004056 A1  Jan. 7, 2016

(30) Foreign Application Priority Data

Jul. 4, 2014 (JP) .................................. 2014-138535

(51) Int. Cl.
*G02B 21/00* (2006.01)
*G02B 27/58* (2006.01)
(Continued)

(52) U.S. Cl.
CPC ....... *G02B 21/008* (2013.01); *G02B 21/0048* (2013.01); *G02B 21/025* (2013.01); *G02B 27/58* (2013.01); *G06T 3/4053* (2013.01)

(58) Field of Classification Search
CPC .... G02B 21/008; G02B 27/58; G02B 21/025; G02B 21/0048; G02B 26/10;
(Continued)

(56) References Cited

U.S. PATENT DOCUMENTS 8,933,418 B2  1/2015  Hayashi
2008/0259442 A1*  10/2008  Matsukawa .......... G02B 21/008
                                                                    359/380
(Continued)

FOREIGN PATENT DOCUMENTS

EP       2037309 A2     3/2009
JP    2000330026 A    11/2000
(Continued)

OTHER PUBLICATIONS

Japanese Office Action dated Nov. 14, 2017 issued in counterpart Japanese Application No. 2014-138535.

*Primary Examiner* — William R Alexander
*Assistant Examiner* — Henry A Duong
(74) *Attorney, Agent, or Firm* — Holtz, Holtz & Volek PC (57) ABSTRACT

It is possible to easily acquire an original image of a specimen that satisfies necessary conditions for generating a super-resolution image. The present invention provides a scanning microscope apparatus that includes an objective lens that irradiates a specimen with laser light emitted from a laser light source; a scanning portion that scans the laser light irradiated onto the specimen via the objective lens; and a PC that acquires an original image of the specimen, calculates, from the magnification of the objective lens, information about the number of pixels of the original image or information about the zoom magnification of the original image that achieves the per-pixel pixel resolution needed to generate a super-resolution image, and controls the scanning portion or image acquisition according to the calculated information about the number of pixels or information about the zoom magnification.

3 Claims, 5 Drawing Sheets

(51) Int. Cl.
*G02B 21/02* (2006.01)
*G06T 3/40* (2006.01)

(58) Field of Classification Search
CPC .............. G02B 26/101; G02B 26/0808; G02B 26/125; G02B 26/105; G02B 26/121; G06T 3/4053; B23K 26/08
USPC ...................................................... 359/212.2
See application file for complete search history.

(56) References Cited

U.S. PATENT DOCUMENTS

| | | | |
|---|---|---|---|
| 2008/0290293 A1 | 11/2008 | Motomura | |
| 2010/0272334 A1* | 10/2010 | Yamada | G01N 1/312 382/128 |
| 2011/0141224 A1* | 6/2011 | Stec | G06T 1/00 348/36 |
| 2013/0015366 A1* | 1/2013 | Hayashi | G01N 21/6458 250/458.1 |
| 2014/0015954 A1* | 1/2014 | Tsujimoto | G06T 3/40 348/79 |
| 2014/0307072 A1* | 10/2014 | Takahashi | H04N 5/23296 348/65 |

FOREIGN PATENT DOCUMENTS

| | | |
|---|---|---|
| JP | 2003195172 A | 7/2003 |
| JP | 2004138947 A | 5/2004 |
| JP | 2008276191 A | 11/2008 |
| JP | 2012083621 A | 4/2012 |
| JP | 2013020083 A | 1/2013 |

* cited by examiner

SCANNING MICROSCOPE APPARATUS FOR GENERATING SUPER-RESOLUTION IMAGE BASED ON SET ZOOM MAGNIFICATION OR SET NUMBER OF PIXELS

CROSS-REFERENCE TO RELATED APPLICATIONS

This application is based on Japanese Patent Application No. 2014-138535, the contents of which are incorporated herein by reference.

TECHNICAL FIELD

The present invention relates to scanning microscope apparatuses.

BACKGROUND ART

In a known super-resolution technique (RRCM) in the related art, image processing (convolution processing) is performed on an image acquired to generate a super-resolution image having a higher resolution than its optical resolution (for example, see PTL 1). In the super-resolution technique disclosed in PTL 1, the diameter of a pinhole is set to about 50% of the most appropriate size for an objective lens, and the optical zoom magnification or the image resolution is set such that a pixel pitch is about twice the desired resolution.

CITATION LIST

Patent Literature

{PTL 1} Japanese Unexamined Patent Application, Publication No. 2013-20083

SUMMARY OF INVENTION

Although PTL 1 discloses a method for generating a matrix equation that is most appropriate for image processing or a method for calculating the pinhole diameter that is necessary for super-resolution imaging, there is no mention of a specific method for generating such a driving signal for a scanning portion that achieves an appropriate pixel pitch. Hence, in the super-resolution technique in PTL 1, a user himself/herself has to figure out a means for achieving the most appropriate pixel pitch and to input necessary parameters, and thus, the process of image acquisition is complicated.

The present invention provides a scanning microscope apparatus in which an original image of a specimen that satisfies necessary conditions for generating a super-resolution image can be easily acquired.

According to an aspect of the present invention, there is provided a scanning microscope apparatus including an objective lens that irradiates a specimen with laser light emitted from a light source; and an image acquisition portion that scans the laser light irradiated onto the specimen via the objective lens to acquire an original image of the specimen; a condition calculating portion that calculates, from the magnification of the objective lens, information about the number of pixels of the original image or information about the zoom magnification of the original image that achieves a per-pixel pixel resolution required to generate a super-resolution image; and a control unit that controls the image acquisition portion according to the information about the number of pixels or the information about the zoom magnification calculated by the condition calculating portion.

According to this aspect, the image acquisition portion scans the laser light emitted from the light source on the specimen via the objective lens and acquires an original image of the specimen. In this case, due to the image acquisition portion being controlled by the control unit according to the information about the number of pixels of the original image or the information about the zoom magnification of the original image calculated by the condition calculating portion from the magnification of the objective lens, the image acquisition portion can acquire an original image with a pixel pitch that satisfies the desired resolution. Accordingly, a user does not need to set the conditions for acquiring the original image with a pixel pitch that satisfies the desired resolution, and hence, the original image of the specimen that satisfies the necessary conditions for generating a super-resolution image can be easily acquired.

The above-described aspect may be configured such that the image acquisition portion includes a scanner that deflects the laser light with swivel mirrors capable of swiveling about predetermined swiveling shafts, and an image constructing portion that constructs the original image according to intensity information of return light returning from the specimen irradiated with the laser light. When the condition calculating portion calculates the information about the number of pixels, the control unit controls the image construction performed by the image constructing portion according to the information about the number of pixels, and when the condition calculating portion calculates the information about the zoom magnification, the control unit controls the scanning of the laser light by the scanner according to the information about the zoom magnification.

With this configuration, because the zoom magnification of the original image is not changed when the control unit controls the image constructing portion according to the information about the number of pixels of the original image calculated by the condition calculating portion, it is possible to acquire an original image with a pixel pitch that satisfies the desired resolution, while maintaining a field-of-view area desired by the user for observation.

Furthermore, because the number of pixels of the original image is not changed when the control unit controls the scanner according to the information about the zoom magnification of the original image calculated by the condition calculating portion, it is possible to acquire an original image with a pixel pitch that satisfies the desired resolution, while maintaining an image acquisition time desired by the user.

The above-described aspect may be configured such that the condition calculating portion calculates the information about the number of pixels according to previously set information about the zoom magnification.

With this configuration, it is possible to acquire an original image with a pixel pitch that satisfies the desired resolution with the field-of-view area desired by the user.

The above-described aspect may be configured such that the control unit displays the information about the number of pixels calculated by the condition calculating portion and/or information about the time for acquiring one image frame.

With this configuration, even when the number of pixels or the image acquisition time is changed to obtain the desired field-of-view area of the original image, the user can acquire the original image with knowledge of the changed number of pixels or image acquisition time.

The above-described aspect may be configured such that the condition calculating portion calculates the information about the zoom magnification according to previously set information about the number of pixels.

With this configuration, it is possible to acquire an original image with a pixel pitch that satisfies the desired resolution with the number of pixels or image acquisition time desired by the user.

The above-described aspect may be configured such that the control unit displays a field-of-view area of the original image that can be acquired according to the information about the zoom magnification calculated by the condition calculating portion.

With this configuration, even when the field-of-view area of the original image is changed to achieve the desired number of pixels or image acquisition time, the user can acquire the original image with knowledge of the changed field-of-view area.

The above-described aspect may be configured such that a user can select one of a first mode, in which the information about the zoom magnification is previously set and the control unit controls the image construction performed by the image constructing portion according to the information about the number of pixels calculated by the condition calculating portion, and a second mode in which the information about the number of pixels is previously set and the control unit controls the scanning of the laser light by the scanning portion according to the information about the zoom magnification calculated by the condition calculating portion.

With this configuration, it is possible to acquire an original image with a pixel pitch that satisfies the desired resolution, while maintaining conditions desired by the user depending on the purpose and situation.

The above-described aspect may be the computer adjusts a range of an angle of the swiveling of the galvanometer mirrors of the scanner according to the calculated zoom magnification.

According to an other aspect of the present invention, there is provided a scanning microscope apparatus including an objective lens that irradiates a specimen with laser light emitted from a light source; a scanner that deflects the laser light with swivel mirrors capable of swiveling about predetermined swiveling shafts; and a computer that: performs control to scan the laser light irradiated onto the specimen via the objective lens to acquire an original image of the specimen; calculates, from the magnification of the objective lens, information about the number of pixels of the original image or information about the zoom magnification of the original image that achieves a per-pixel pixel resolution required to generate a super-resolution image; controls the image acquisition according to the calculated information about the number of pixels; constructs the original image according to intensity information of return light returning from the specimen irradiated with the laser light; adjusts a range of an angle of the swiveling of the galvanometer mirrors of the scanner according to the calculated zoom magnification; calculates the information about the number of pixels according to previously set information about the zoom magnification; and controls the image construction to be performed and the scanning of the laser light according to the information about the number of pixels.

In the above aspects of the present invention, the functions of the image acquisition portion, the condition calculating portion, the control unit and the image constructing portion are performed by a computer.

The present invention provides an advantage that it is possible to easily acquire an original image of a specimen that satisfies necessary conditions for generating a super-resolution image.

DESCRIPTION OF EMBODIMENT

A scanning microscope apparatus according to an embodiment of the present invention will be described below with reference to the drawings.

Figure 1:
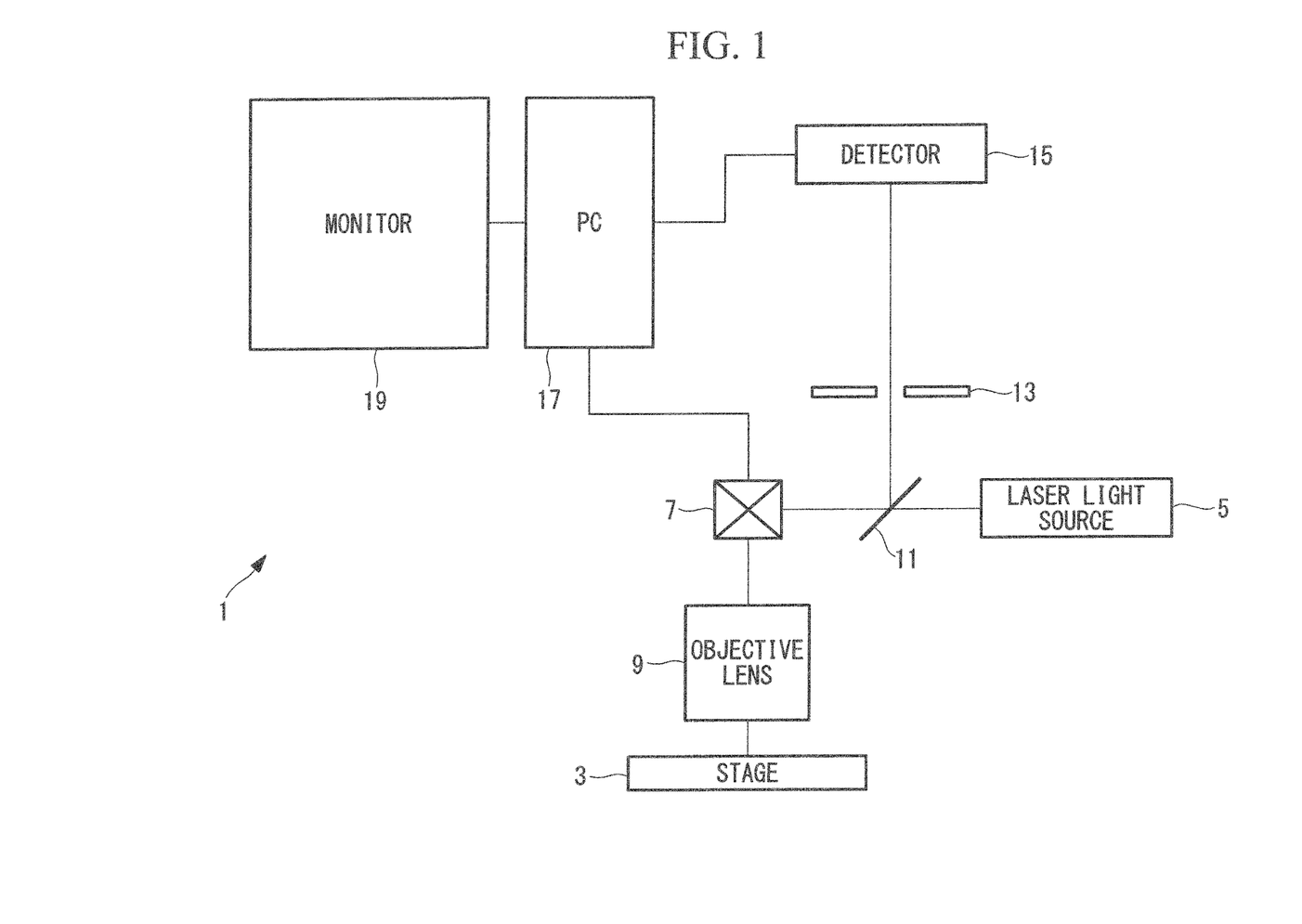
FIG. 1 is a schematic diagram showing the configuration of a scanning microscope apparatus according to an embodiment of the present invention.

As shown in FIG. 1, a scanning microscope apparatus 1 according to this embodiment includes a stage 3 that holds a specimen S (for example, see FIG. 4 and FIG. 7) thereon, a laser light source (light source) 5 that emits laser light, a scanning portion (image acquisition portion, scanner) 7 that scans the laser light emitted from the laser light source 5, and an objective lens 9 that irradiates the laser light scanned by the scanning portion 7 onto the specimen S and that collects return light returning from the specimen S.

The scanning microscope apparatus 1 also includes a dichroic mirror 11 that splits off the return light collected by the objective lens 9 from the optical path of the laser light, a pinhole 13 that limits the beam of the return light split off by the dichroic mirror 11, a detector 15 that detects the return light passing through the pinhole 13, a personal computer (PC, image acquisition portion, condition calculating portion, control unit, image constructing portion) 17 that controls the scanning portion 7 and the detector 15 and generates an original image needed to form a super-resolution image, and a monitor 19 that displays the image generated by the PC 17, scanning conditions, etc. The PC 17 has, for example, a CPU 27, a ROM 29, a RAM 31, and an interface (I/F) 33, and the CPU 27 executes instructions stored on the ROM 29 in order to implement the features of the present invention including the image acquisition portion, condition calculating portion, control unit, and image constructing portion. The interface 33 provides a connection with external equipment.

The scanning portion 7 is, for example, a galvanometer scanner and includes two galvanometer mirrors (not shown) that can swivel about swiveling shafts provided perpendicular to each other. The scanning portion 7 can two-dimensionally scan the laser light across the specimen S by deflecting the laser light from the laser light source 5 in two directions that are perpendicular to each other with the two galvanometer mirrors.

The scanning microscope apparatus 1 according to this embodiment can scan a square area with a diagonal length of 1800 μm when using a 10× objective lens 9. When using the 10× objective lens 9, one side of the square area is 1272.792 . . . μm, and when using a 100× objective lens 9, one side of the square area is 127.2792 . . . μm.

The objective lens 9 may be replaced with another objective lens having a different magnification.

The dichroic mirror 11 allows the laser light from the laser light source 5 to pass therethrough toward the scanning portion 7 and reflects the return light, which is collected by the objective lens 9 and returns along the optical path of the laser light via the scanning portion 7, toward the pinhole 13.

The pinhole 13 is disposed at a position conjugate with the image position of the objective lens 9. The pinhole 13 allows only return light from the focal position of the objective lens 9 on the specimen S to pass therethrough among the return light returning from the dichroic mirror 11.

The detector 15 is, for example, a photomultiplier tube and transmits light intensity signals corresponding to the intensity of the detected return light to the PC 17.

The PC 17 integrates the light intensity signals transmitted from the detector 15 for each pixel corresponding to the position scanned with the laser light by the scanning portion 7 to generate a two-dimensional image of the specimen S. Furthermore, the PC 17 includes a graphical user interface (GUI) that allows a user to input scanning conditions via an input device (not shown), such as a mouse and a keyboard.

Figure 2:
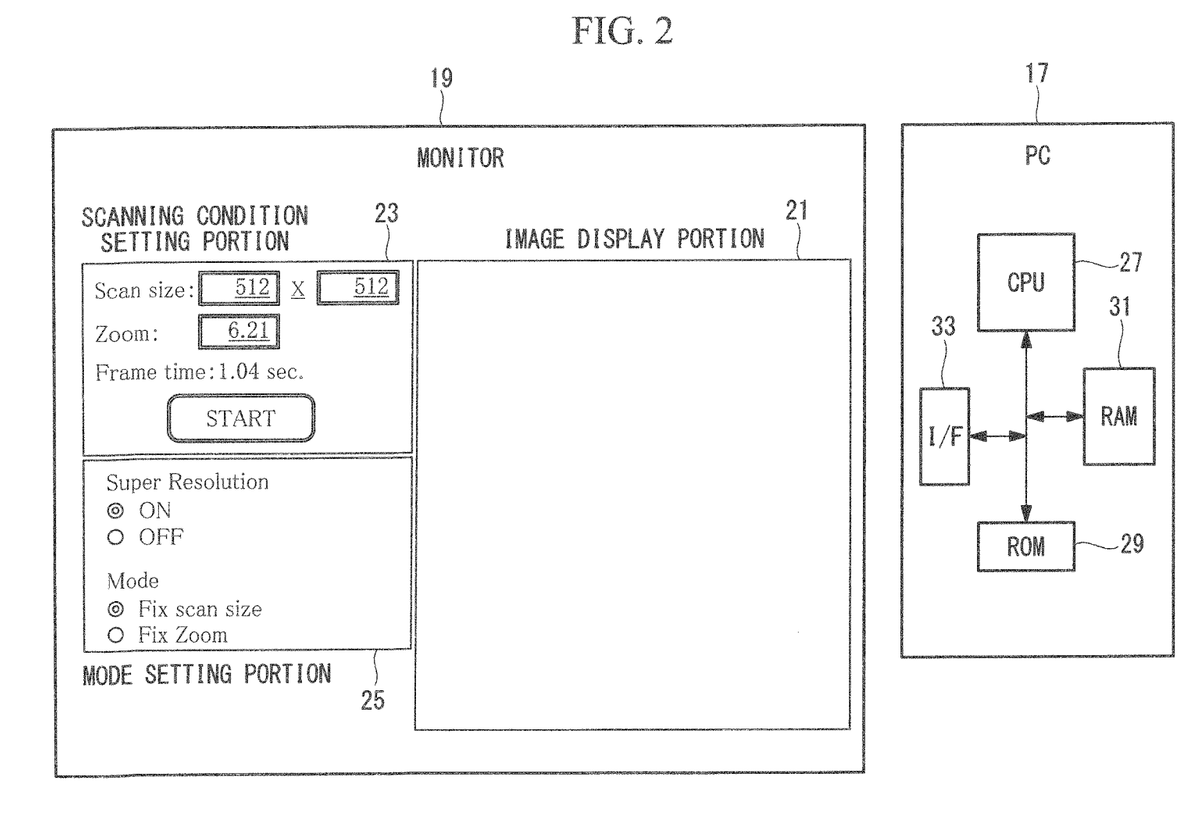
FIG. 2 is a diagram showing the configuration of a PC and a monitor in FIG. 1.

As shown in FIG. 2, the GUI includes an image display portion 21 that displays a generated image, a scanning condition setting portion 23 via which the scanning conditions are set, and a mode setting portion 25 via which the mode concerning generation of a super-resolution image is set, which are displayed on the monitor 19.

The scanning condition setting portion 23 has "Scan size" that shows or accepts input of the number of pixels, i.e., the scan size, of the image; "Zoom" that shows or accepts input of the zoom magnification of the image; and "Frame time" that shows the time for acquiring one frame of the image. The scanning condition setting portion 23 also has "START" that serves as a start button for starting image acquisition.

The mode setting portion 25 shows "Super Resolution" via which super-resolution imaging is turned ON/OFF, and "Mode" via which the user selects the mode when performing the super-resolution imaging. "Mode" allows selection from "Fix scan size" for setting to a fixed-scan-size mode (first mode) in which an original image is acquired with a fixed scan size and "Fix Zoom" for setting a fixed-zoom mode (second mode) in which an original image is acquired with a fixed image zoom magnification.

In the fixed-zoom mode, the PC 17 calculates such a scan size of the original image that achieves the per-pixel pixel resolution needed to generate a super-resolution image from the magnification of the objective lens 9 used and the previously set zoom magnification of the image.

Then, the PC 17 constructs an image from the calculated scan size. The PC 17 also calculates the time for acquiring one image frame from the calculated scan size and displays the calculated time and the scan size on the scanning condition setting portion 23 of the monitor 19.

Furthermore, in the fixed-scan-size mode, the PC 17 calculates such a zoom magnification that achieves the per-pixel pixel resolution needed to generate a super-resolution image from the magnification of the objective lens 9 used and the previously set scan size.

Then, the PC 17 adjusts the swivel angles of the galvanometer mirrors of the scanning portion 7 according to the calculated zoom magnification. For example, by reducing the swivel angles of the galvanometer mirrors of the scanning portion 7, the generated image can be zoomed up. By reducing the swivel angles of the galvanometer mirrors, the area scanned by the laser light is reduced. Hence, by generating an image using the return light from the reduced scanning area without changing the scan size, the generated image is enlarged. Furthermore, the PC 17 displays the calculated zoom magnification on the scanning condition setting portion 23 of the monitor 19 and displays, on the image display portion 21 of the monitor 19, the field-of-view area of the original image that can be acquired according to that zoom magnification.

Moreover, the PC 17 performs image computational processing on the generated image of the specimen S, serving as the original image, to emphasize a high-frequency component. By doing so, a super-resolution component of the original image is visualized, and a super-resolution image that has a higher resolution than its optical resolution is generated.

Figure 3:
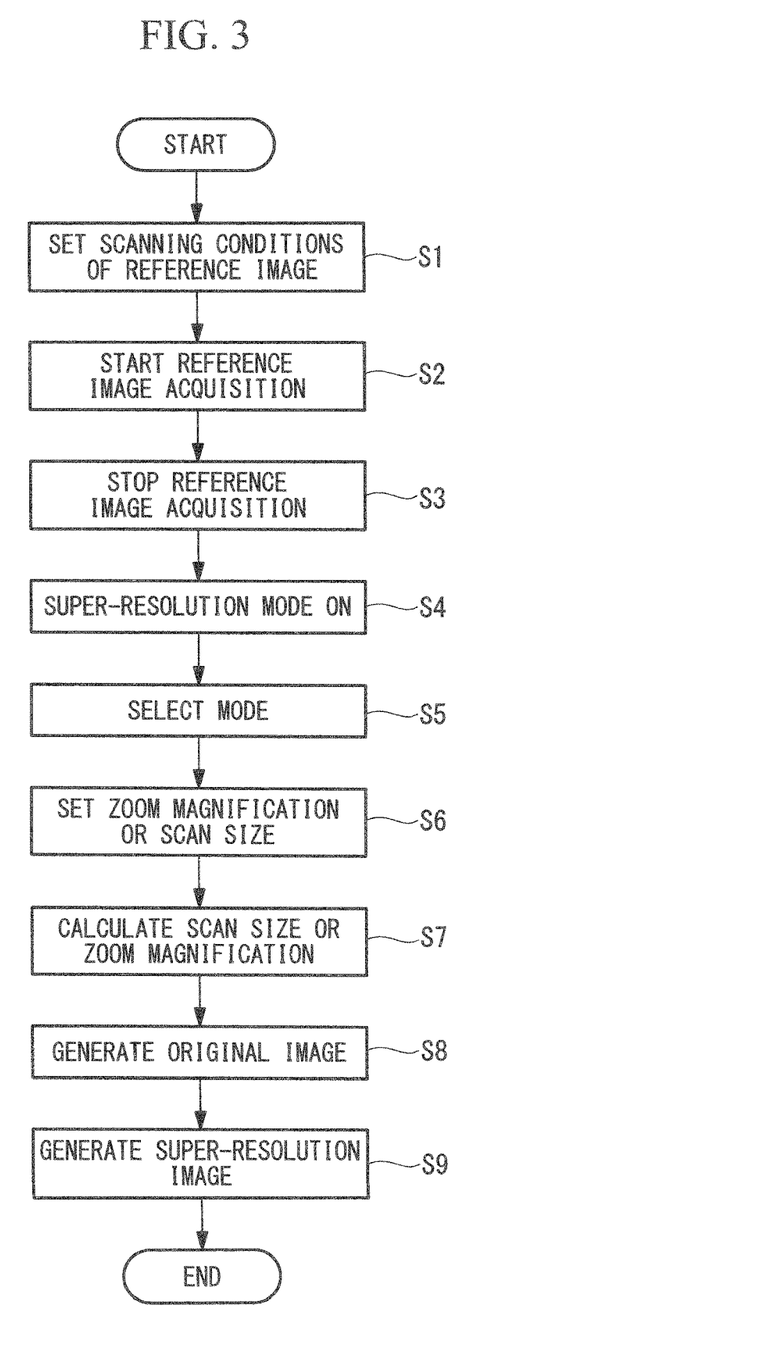
FIG. 3 is a flowchart showing a process of generating a super-resolution image with the scanning microscope apparatus in FIG. 1.

The operation of the thus-configured scanning microscope apparatus 1 will be described with reference to the flowchart in FIG. 3.

When a super-resolution image is acquired with the scanning microscope apparatus 1 according to this embodiment, first, a reference image including a plurality of specimens S is acquired.

In this case, as shown in FIG. 2, the user sets the scan size and the zoom magnification, serving as the scanning conditions for acquiring the reference image, via the scanning condition setting portion 23 on the monitor 19 (step S1). For example, the 100× objective lens 9 is used, and the scan size is set to 512×512, and the zoom is set to 1×.

Next, the user pushes "START" on the scanning condition setting portion 23 on the monitor 19 to start image acquisition (step S2). Laser light emitted from the laser light source 5 and passing through the dichroic mirror 11 is scanned by the scanning portion 7 and is irradiated onto the specimens S on the stage 3 via the objective lens 9. In this way, the laser light is two-dimensionally scanned in the field-of-view area including the specimens S, in response to the swiveling movement of the galvanometer mirrors of the scanning portion 7.

The return light returning from the specimens S due to irradiation with the laser light is collected by the objective lens 9, passes through the scanning portion 7, and is reflected by the dichroic mirror 11. Of the return light reflected by the dichroic mirror 11, only the return light from the focal position of the objective lens 9 passes through the pinhole 13 and is detected by the detector 15.

Figure 4:
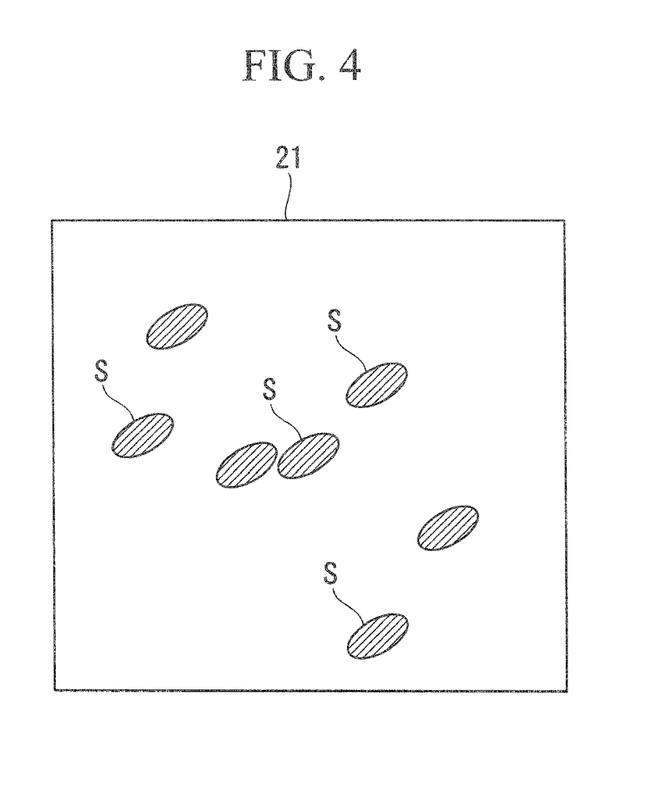
FIG. 4 is a diagram showing an example of an image acquired by using a 100× objective lens, with a scan size setting of 512×512 and a zoom setting of 1×.

The detector 15 transmits light intensity signals corresponding to the brightness of the detected return light to the PC 17. The PC 17 integrates the light intensity signals transmitted from the detector 15 for each pixel corresponding to the position scanned with the laser light by the scanning portion 7 and generates a two-dimensional reference image (step S3). The generated reference image is displayed on the monitor 19. In this embodiment, as a result of using the 100× objective lens 9 and setting the scan size to 512×512 and the zoom to 1×, for example, an image shown in FIG. 4 is acquired.

Next, necessary settings for super-resolution imaging are made.

In this case, the user selects "ON" for "Super Resolution" (step S4) and selects either "Fix scan size" or "Fix Zoom" for "Mode" (step S5) in the mode setting portion 25 on the monitor 19.

Figure 5:
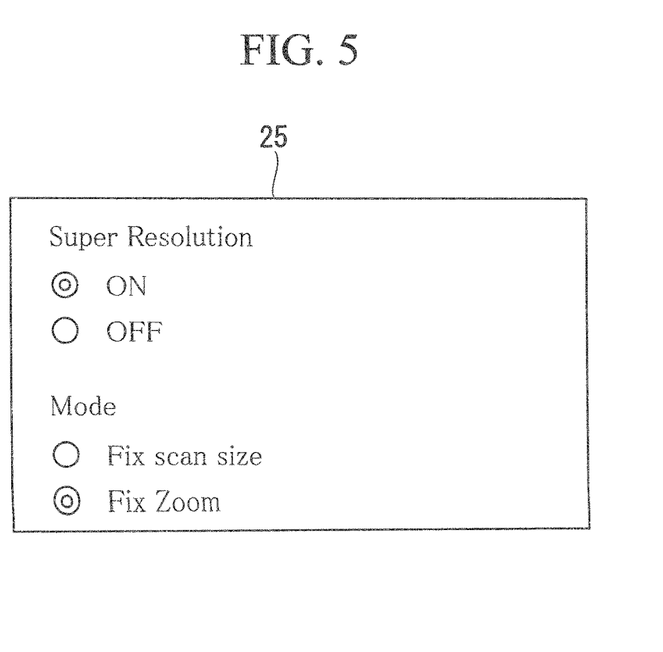
FIG. 5 is a diagram showing a case where a fixed-zoom mode is selected in a mode setting portion displayed on the monitor in FIG. 2.

First, a case where "Fix Zoom" is selected, i.e., a case where the fixed-zoom mode is selected, as shown in FIG. 5, will be described.

This embodiment shows an example case where a super-resolution image having a field-of-view with a zoom magnification of 1× and an aspect ratio of 1:1 is acquired by using the 100× objective lens 9.

In this case, the user enters 1 in "Zoom" via the scanning condition setting portion 23 on the monitor 19 to set the zoom magnification (step S6).

The PC 17 calculates the number of pixels in the horizontal and vertical directions needed to generate a super-resolution image from the magnification (100×) of the objective lens 9 used and the zoom magnification (1×). For example, according to the related art (Japanese Unexamined Patent Application, Publication No. 2013-20083), when a resolution of 100 nm is to be achieved in super-resolution imaging, the pixel pitch of the original image needs to be 40 nm, which is 1/2.5 times 100 nm. As has been described above, because one side of the square area that can be scanned when using the 100× objective lens 9 is 127.2792 . . . μm, in this case, the number of pixels, in the horizontal and vertical directions, in the original image calculated by the PC 17 is 3182 (step S7).

Consequently, the PC 17 sets the scan size of the original image to be generated to 3182×3182. Furthermore, the PC 17 calculates the time for acquiring one image frame according to the calculated number of pixels. Then, the scanning condition setting portion 23 on the monitor 19 displays the scan size (3182×3182) and the time for acquiring one frame of the image of that scan size.

Next, according to these scanning conditions, an image shown in FIG. 4 is generated in the same way as the reference image (step S8). By doing so, the PC 17 acquires an original image with a zoom magnification of 1× and a scan size of 3182×3182. Then, the PC 17 performs image computational processing on the generated original image of the specimens S to emphasize a high-frequency component. In this way, a super-resolution image having a higher resolution than its optical resolution can be generated (step S9).

In this case, due to the PC 17 adjusting the image construction according to the scan size calculated from the magnification of the objective lens 9 and the zoom magnification of the image, an original image with a pixel pitch that satisfies the desired resolution can be acquired. Furthermore, because the zoom magnification of the original image is not changed in the fixed-zoom mode, it is possible to acquire an original image with a pixel pitch that satisfies the desired resolution, while maintaining a field-of-view area desired by the user for observation.

Furthermore, because the scan size and the time for acquiring one image frame are displayed on the monitor 19, the user can ascertain the size of the original image and the time needed for scanning it before starting super-resolution imaging. The fixed-zoom mode is effective when it is desired to increase the field of view that can be acquired in one frame.

Figure 6:
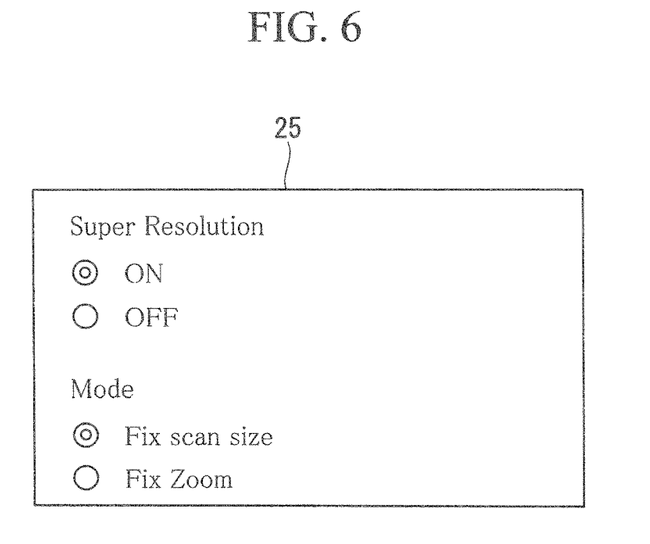
FIG. 6 is a diagram showing a case where fixed-scan-size mode is selected in the mode setting portion displayed on the monitor in FIG. 2.

Next, a case where "Fix scan size", i.e., the fixed-scan-size mode, is selected in the mode setting portion 25 on the monitor 19, as shown in FIG. 6, will be described.

This embodiment shows an example case where a super-resolution image with a scan size of 512×512 is acquired by using the 100× objective lens 9.

In this case, the user sets the scan size by entering 512×512 in "Scan size" via the scanning condition setting portion 23 on the monitor 19 (step S6).

The PC 17 calculates the zoom magnification of the original image needed to generate a super-resolution image from the magnification (100×) of the objective lens 9 used and the scan size (512×512). As has been described above, one side of the square area that can be scanned when using the 100× objective lens 9 is 127.2792 . . . μm. In this embodiment, because the scan size is set to 512, the pixel pitch in this case is 0.2485921 . . . μm. When, for example, a resolution of 100 nm is to be achieved in super-resolution imaging, the pixel pitch of the original image needs to be 40 nm, which is 1/2.5 times 100 nm, as described above. Hence, in this case, the zoom magnification of the original image calculated by the PC 17 is 6.21 (step S7).

Figure 7:
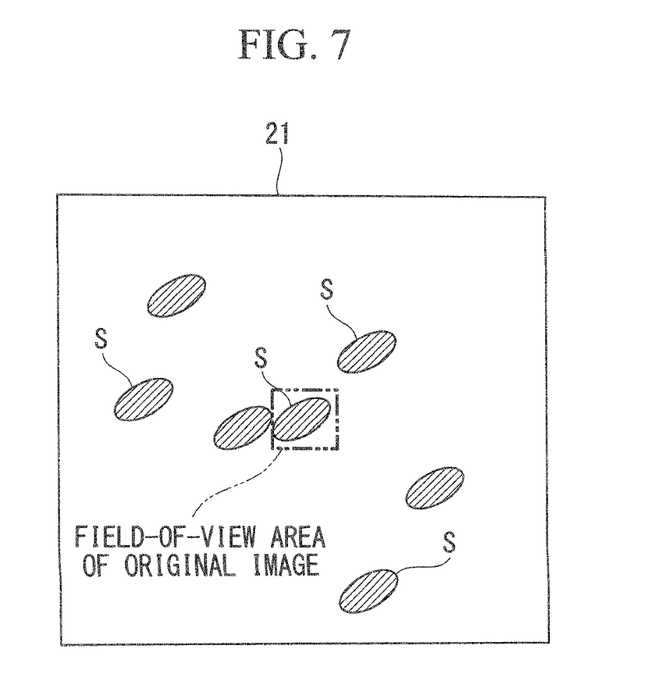
FIG. 7 is a diagram showing a field of view in an original image displayed on the image in FIG. 4.

Consequently, the PC 17 reduces the swivel angles of the galvanometer mirrors of the scanning portion 7 according to the calculated zoom magnification (6.21×). Furthermore, the PC 17 displays the zoom magnification (6.21×) on the scanning condition setting portion 23 on the monitor 19, and, as shown in FIG. 7, the field-of-view area of the original image that can be acquired with that zoom magnification (6.21×) is superimposed on the reference image shown on the image display portion 21 on the monitor 19.

Next, an image of the specimens S is generated according to these scanning conditions in the same way as the reference image (step S8). By doing so, the PC 17 acquires an original image with a zoom magnification of 6.21× and a scan size of 512×512. Then, the PC 17 performs image computational processing on the generated original image of the specimens S to generate a super-resolution image having a higher resolution than its optical resolution (step S9).

In this case, due to the PC 17 controlling the scanning portion 7 according to the zoom magnification of the original image calculated from the magnification of the objective lens 9 and the scan size, an original image with a pixel pitch that satisfies the desired resolution can be acquired. Furthermore, because the scan size is not changed in the fixed-scan-size mode, an original image with a pixel pitch that satisfies the desired resolution can be acquired with a scan size and image acquisition time desired by the user.

Furthermore, because the field-of-view area of the original image is displayed on the reference image, the user can understand what area is to be scanned when super-resolution imaging is performed. The fixed-scan-size mode is effective when it is desired that the time for acquiring one image frame be short.

As has been described above, with the scanning microscope apparatus 1 according to this embodiment, there is no need for a user to set conditions for acquiring an original image with a pixel pitch that satisfies the desired resolution, and an original image of a specimen S that satisfies the necessary conditions for generating a super-resolution image can be easily acquired.

REFERENCE SIGNS LIST 1 scanning microscope apparatus
5 laser light source (light source)
9 objective lens
17 PC (image acquisition portion, condition calculating portion, control unit, image constructing portion)
21 scanning portion (image acquisition portion, scanner)

The invention claimed is:

1. A method for controlling a scanning microscope apparatus comprising a laser light source, a scanner which includes a plurality of mirrors, a detector, and an objective lens, the method including:

setting, according to a first instruction input via an input device by a user, conditions including a number of pixels and a zoom magnification for acquiring a reference image of a specimen;

scanning, with the scanner, laser light emitted from the laser light source and irradiated onto the specimen via the objective lens, based on the set number of pixels and the set zoom magnification, detecting corresponding return light from the specimen with the detector, and acquiring the reference image based on the detected return light;

selecting, according to a second instruction input via the input device by the user, either one of a fixed-scan-size mode or a fixed-zoom mode;

in a case in which the fixed-zoom mode is selected:

calculating, by a computer, a number of pixels of an original image to be acquired with a fixed zoom magnification and that achieves a per-pixel pixel resolution needed to generate a super-resolution image, the number of pixels being calculated from a magnification of the objective lens and the set zoom magnification which was set for acquiring the reference image, newly scanning, with the scanner, laser light emitted from the laser light source and irradiated onto the specimen via the objective lens, based on the calculated number of pixels and the set zoom magnification which was set for acquiring the reference image, detecting corresponding return light from the specimen with the detector, and acquiring the original image having the calculated number of pixels, the set zoom magnification, and the per-pixel pixel resolution needed to generate the super-resolution image, based on the corresponding detected return light, and generating the super-resolution image by performing image computational processing on the original image acquired in the fixed-zoom mode to emphasize a high-frequency component, wherein the super-resolution image is defined as an image having a higher resolution than its optical resolution; and in a case in which the fixed-scan-size mode is selected:

calculating, by the computer, a zoom magnification of an original image to be acquired with a fixed scan-size and that achieves the per-pixel pixel resolution needed to generate the super-resolution image, the zoom magnification being calculated from the magnification of the objective lens and the set number of pixels which was set for acquiring the reference image, adjusting swivel angles of the mirrors of the scanner according to the calculated zoom magnification, newly scanning, with the scanner having the mirrors at the adjusted swivel angles, laser light emitted from the laser light source and irradiated onto the specimen via the objective lens, based on the calculated zoom magnification and the set number of pixels which was set for acquiring the reference image, detecting corresponding return light from the specimen with the detector, and acquiring the original image having the calculated zoom magnification, the set number of pixels, and the per-pixel pixel resolution needed to generate the super-resolution image, based on the corresponding detected return light, and generating the super-resolution image by performing image computational processing on the original image acquired in the fixed-scan-size mode to emphasize a high-frequency component.

2. The method according to claim 1, further including displaying on a display, by the computer, at least one of information about the calculated number of pixels and information about a time for acquiring one image frame.

3. The method according to claim 1, further including displaying on a display, by the computer, a field-of-view area of the original image that can be acquired according to the information about the calculated zoom magnification.

* * * * *